United States Patent
Sakai et al.

(10) Patent No.: US 11,746,247 B2
(45) Date of Patent: Sep. 5, 2023

(54) AQUEOUS PIGMENT DISPERSION LIQUID

(71) Applicant: DAINICHISEIKA COLOR & CHEMICALS MFG. CO., LTD., Tokyo (JP)

(72) Inventors: Yosuke Sakai, Tokyo (JP); Misaki Narita, Tokyo (JP); Yasuhiro Yoshida, Tokyo (JP); Shinichiro Aoyagi, Tokyo (JP); Yoshikazu Murakami, Tokyo (JP); Hiroyuki Shimanaka, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 17/438,812

(22) PCT Filed: Mar. 17, 2020

(86) PCT No.: PCT/JP2020/011658
§ 371 (c)(1),
(2) Date: Sep. 13, 2021

(87) PCT Pub. No.: WO2020/196082
PCT Pub. Date: Oct. 1, 2020

(65) Prior Publication Data
US 2022/0127485 A1 Apr. 28, 2022

(30) Foreign Application Priority Data

Mar. 22, 2019 (JP) ................... 2019-055173
Jun. 12, 2019 (JP) ................... 2019-109366

(51) Int. Cl.
| | |
|---|---|
| C09D 17/00 | (2006.01) |
| C08F 220/18 | (2006.01) |
| C08F 220/14 | (2006.01) |
| C08F 220/34 | (2006.01) |
| C08F 226/06 | (2006.01) |
| C08K 5/00 | (2006.01) |
| C09B 67/46 | (2006.01) |
| C08G 65/08 | (2006.01) |
| C08G 65/333 | (2006.01) |
| G03G 9/08 | (2006.01) |

(52) U.S. Cl.
CPC .......... *C09D 17/001* (2013.01); *C08F 220/14* (2013.01); *C08F 220/1804* (2020.02); *C08F 220/1807* (2020.02); *C08F 220/34* (2013.01); *C08F 226/06* (2013.01); *C08G 65/08* (2013.01); *C08G 65/33303* (2013.01); *C08K 5/0041* (2013.01); *C09B 67/009* (2013.01); *C09D 17/003* (2013.01); *G03G 9/0806* (2013.01); *C08K 2201/003* (2013.01)

(58) Field of Classification Search
None
See application file for complete search history.

(56) References Cited

U.S. PATENT DOCUMENTS

| | | | | |
|---|---|---|---|---|
| 8,591,021 | B2 * | 11/2013 | Li ................. | C09D 11/326 347/100 |
| 9,732,176 | B2 * | 8/2017 | Shimanaka ........... | C09D 7/45 |
| 9,988,480 | B2 | 6/2018 | Shimanaka et al. | |
| 9,998,480 | B1 * | 6/2018 | Gates ................ | G06F 21/577 |
| 2002/0007765 | A1 * | 1/2002 | Sano ................. | C09D 11/322 106/31.89 |
| 2008/0314292 | A1 | 12/2008 | Shimanaka et al. | |
| 2009/0234062 | A1 | 9/2009 | Kok et al. | |
| 2010/0116010 | A1 | 5/2010 | Fechner et al. | |

(Continued)

FOREIGN PATENT DOCUMENTS

| | | |
|---|---|---|
| CN | 1713955 | 12/2005 |
| CN | 103974987 | 8/2014 |

(Continued)

OTHER PUBLICATIONS

Notice of Reasons for Refusal issued in Japanese Patent Application No. 2019-109366, dated Feb. 4, 2020, 6 pages w/translation.
Notice of Reasons for Refusal issued in Japanese Patent Application No. 2019-109366, dated Jun. 30, 2020, 9 pages w/translation.
Notice of Reasons of Refusal issued in Japanese Patent Application No. 2020-066737, dated Jun. 30, 2020, 7 pages/translation.
International Search Report issued in International Application No. PCT/JP2020/011658, dated Jun. 16, 2020, 6 pages w/translation.
International Search Report, issued in the related PCT application No. PCT/JP2013/081797, dated Mar. 4, 2014, 2 pages.

(Continued)

*Primary Examiner* — Satya B Sastri
(74) *Attorney, Agent, or Firm* — Hamre, Schumann, Mueller & Larson, P.C.

(57) ABSTRACT

The present invention provides an aqueous pigment dispersion liquid being such that a pigment is finely dispersed, and the viscosity, and the particle diameters of the pigment are unlikely to fluctuate, being excellent in storage stability, and enabling preparation of an emulsion-polymerized toner having properly controlled particle diameters while improving the pigment utilization rate. The aqueous pigment dispersion liquid is an aqueous pigment dispersion liquid for an emulsion-polymerized toner containing a pigment, a dispersant, and an aqueous medium. The dispersant is a polymer containing a constitutional unit (A) derived from a monomer (A) such that a group containing a (meth)acryloyloxy group or the like is bonded to one end of a particular polyethylene glycol chain or the like, and a constitutional unit (B) derived from a monomer (B) having a carboxy group or the like, the polymer has a number average molecular weight in terms of polystyrene of 4,000 to 15,000, as measured by gel permeation chromatography, the polymer is contained in a state of being not ionized substantially, and the aqueous pigment dispersion liquid has a pH of 3.0 to 8.4.

6 Claims, No Drawings

(56) References Cited

U.S. PATENT DOCUMENTS

| | | |
|---|---|---|
| 2011/0014401 A1 | 1/2011 | Fujimaki et al. |
| 2011/0223529 A1 | 9/2011 | Shimanaka et al. |
| 2013/0023628 A1 | 1/2013 | Niitani et al. |
| 2014/0342281 A1 | 11/2014 | Yamada et al. |
| 2015/0152212 A1 | 6/2015 | Umemoto |
| 2015/0291718 A1 | 10/2015 | Shimanaka et al. |

FOREIGN PATENT DOCUMENTS

| | | | |
|---|---|---|---|
| EP | 1630211 A1 * | 3/2006 | ............. C09D 11/32 |
| EP | 2559715 | 2/2013 | |
| EP | 2789635 | 10/2014 | |
| JP | 9-176511 | 7/1997 | |
| JP | 10-030010 | 2/1998 | |
| JP | 11-143125 | 5/1999 | |
| JP | 2001-005218 | 1/2001 | |
| JP | 2001-324834 | 11/2001 | |
| JP | 2002-155229 | 5/2002 | |
| JP | 2003-238837 | 8/2003 | |
| JP | 2006-506491 | 2/2006 | |
| JP | 2006-273974 | 10/2006 | |
| JP | 2007-270089 | 10/2007 | |
| JP | 2008-298967 | 12/2008 | |
| JP | 2009-024165 | 2/2009 | |
| JP | 2009-227839 | 10/2009 | |
| JP | 2010-95591 | 4/2010 | |
| JP | 2010-530008 | 9/2010 | |
| JP | 2011-068865 | 4/2011 | |
| JP | 2011-241259 | 12/2011 | |
| JP | 2011-245670 | 12/2011 | |
| JP | 2012-036251 | 2/2012 | |
| JP | 2012-097129 | 5/2012 | |
| JP | 2012-098381 | 5/2012 | |
| JP | 2012-220637 | 11/2012 | |
| JP | 2013-205593 | 10/2013 | |
| JP | 2014-222303 | 11/2014 | |
| WO | 2009/054514 | 4/2009 | |
| WO | 2010/013651 | 2/2010 | |
| WO | 2011/129078 | 10/2011 | |
| WO | 2014/091923 | 6/2014 | |

OTHER PUBLICATIONS

Chinese Office Action, issued in the related Chinese application No. 201380064932.6, dated Mar. 23, 2016, 6 pages.

Korean Office Action, issued in the related Korean patent application No. 10-2015-7018618, dated Mar. 29, 2017, 5 pages.

European Communication of notice of opposition, issued in the related European patent No. 2933297, dated Feb. 19, 2018, 53 pages.

Page 51 of Petrochemical Products General Catalog of NOF Corporation, 7 pages, Dec. 15, 2016 (Chemical formulas, which are the same as English ones, of the products are listed.).

Chinese Office Action, issued in the corresponding Chinese patent application No. 201380064932.6, dated Apr. 19, 2017, 9 pages.

Jones et al., "Thermoresponsive copolymers of methacrylic acid and poly(ethylene glycol) methyl ether methacrylate", Department of Chemistry, Journal of Polymer Science, vol. 43, pp. 6095-6104, 2005.

Rungsardthong et al., "Copolymers of amine methacrylate with poly(ethylene glycol) as vectors for gene therapy", Journal of Controlled Release, vol. 73, pp. 359-380, 2001.

U.S. Appl. No. 14/439,918, filed Apr. 30, 2015, 2015/0291718, U.S. Pat. No. 9,732,176.

U.S. Appl. No. 15/645,650, filed Jul. 10, 2017, 2017/0306071, U.S. Pat. No. 9,998,480.

* cited by examiner

AQUEOUS PIGMENT DISPERSION LIQUID

TECHNICAL FIELD

The present invention relates to an aqueous pigment dispersion liquid, and particularly relates to an aqueous pigment dispersion liquid for an emulsion-polymerized toner. More specifically, the present invention relates to an aqueous pigment dispersion liquid that is excellent in a pigment utilization rate and particle diameter control of a pigment during production of an emulsion-polymerized toner, and is useful as a material in producing the emulsion-polymerized toner, or the like.

BACKGROUND ART

In the past, a pulverized toner obtained by mixing a binder resin and a pigment, and if necessary, further mixing a charge control agent, a magnetic substance, a wax component, and other materials, melt-kneading a resultant mixture, and then pulverizing and classifying a resultant melt-kneaded product has been used as a toner for an electrophotographic copying machine or printer. In recent years, polymerized toners have been proposed for the purpose of achieving enhancement in image quality by micronization and particle diameter control of toner particles. Polymerized toners are classified roughly into an emulsion-polymerized toner and a suspension-polymerized toner. Among these, the emulsion-polymerized toner is prepared by adding an aqueous dispersion of a pigment (aqueous pigment dispersion liquid) and other components to an emulsified product (emulsion) of a binder resin obtained by emulsion polymerization, and then subjecting a resultant mixture to aggregation-and-fixation to make particles into desired particle diameters (Patent Literatures 1 to 3).

CITATION LIST

Patent Literature

Patent Literature 1: Japanese Patent Laid-Open No. 11-143125
Patent Literature 2: Japanese Patent Laid-Open No. 2001-5218
Patent Literature 3: Japanese Patent Laid-Open No. 2001-324834

SUMMARY OF INVENTION

Technical Problem

In the methods proposed in Patent Literatures 1 to 3, surfactants, such as sodium dodecyl sulfate, sodium dodecylbenzene sulfonate, and polyoxyethylene nonylphenyl ether, are used as a dispersant that disperses a pigment for an aqueous dispersion of the pigment. However, when an emulsion-polymerized toner is prepared using such an aqueous dispersion of the pigment, there has been a problem that it is difficult to allow the pigments to aggregate in a process of subjecting toner particles to aggregation-and-fixation, so that the pigment utilization rate is likely to lower. In addition, there has also been a problem that it is difficult to control the particle diameters of the toner particles which are to be produced.

Toners are usually used in four colors of a yellow color, a magenta color, a cyan color, and a black color as basic colors. As a pigment that exhibits a yellow color among the four colors, azo pigments, such as Pigment Yellow 74, are generally used. However, using non-azo pigments as the yellow pigment tends to be required taking an influence on the environment into consideration. Among others, using Pigment Yellow 185, which is an isoindoline-based pigment, has been studied in terms of weatherability, color developability, and hue. However, Pigment Yellow 185 is highly hydrophilic and is poor in alkali resistance, and therefore it is difficult to prepare a high-concentration aqueous pigment dispersion liquid. Further, there is also a problem that Pigment Yellow 185 has low dispersion stability.

The present invention has been completed in view of such problems of the conventional techniques, and an object of the present invention is to provide an aqueous pigment dispersion liquid being such that a pigment is finely dispersed, and the viscosity, and the particle diameters of the pigment are unlikely to fluctuate, being excellent in storage stability, and enabling preparation of an emulsion-polymerized toner having properly controlled particle diameters while improving the pigment utilization rate.

Solution to Problem

That is, according to the present invention, an aqueous pigment dispersion liquid described below is provided.
[1] An aqueous pigment dispersion liquid containing: a pigment; a dispersant that disperses the pigment; and an aqueous medium containing water, wherein the dispersant is a polymer containing: a constitutional unit (A) derived from a monomer (A) such that a group containing a (meth)acryloyloxy group or a (meth)acryloylamino group is bonded to one end of any one of the following molecular chains of (i) to (iii); and a constitutional unit (B) derived from a monomer (B) having a carboxy group or an amino group, a content of an oxyethylene unit derived from the monomer (A) in the polymer is 50 to 90% by mass based on the total mass of the polymer, the polymer has a number average molecular weight in terms of polystyrene of 4,000 to 15,000, as measured by gel permeation chromatography, the polymer is contained in a state of being not ionized substantially, and the aqueous pigment dispersion liquid has a pH of 3.0 to 8.4:

(i) a polyethylene glycol chain having an average number of repeating oxyethylene units n of 4 to 20;

(ii) a polyethylene glycol monoalkyl (C1-18) ether chain having an average number of repeating oxyethylene units n of 4 to 20; and (iii) a molecular chain represented by the following formula (1), the molecular chain having an average number of repeating oxyethylene oxypropylene units n of 20 to 50 and a content of an oxyethylene unit of 70 to 92% by mass:

$$R—(OEt)_x-(OPr)_y-A \qquad (1)$$

wherein R represents a C1-18 alkyl group, A represents OH or $NH_2$, Et represents an ethylene group, Pr represents a propylene group, and x+y=n.
[2] The aqueous pigment dispersion liquid according to [1], being a pigment dispersion liquid for an emulsion-polymerized toner.
[3] The aqueous pigment dispersion liquid according to [1] or [2], wherein the polymer is (1) a random copolymer, or (2) (2-1) an A-B block copolymer or (2-2) an A-B-A block copolymer having a polymer block A containing the constitutional unit (A) and a polymer block B containing the constitutional unit (B), or (2-3) a graft copolymer such that the polymer block B is a main chain, and the polymer block A is grafted onto the main chain.

[4] The aqueous pigment dispersion liquid according to any one of [1] to [3], wherein the monomer (B) is (meth)acrylic acid, or at least one selected from the group consisting of vinylpyridine, vinylimidazole, and dimethylaminoethyl (meth)acrylate, and a content of the constitutional unit (B) in the polymer is 3 to 15% by mass based on the total mass of the polymer.

[5] The aqueous pigment dispersion liquid according to any one of [1] to [4], wherein the pigment is a yellow-based pigment containing Pigment Yellow 185, and the monomer (B) is a monomer having an amino group.

[6] The aqueous pigment dispersion liquid according to any one of [1] to [5], wherein the pigment has a number average particle diameter of 80 to 300 nm, as measured by a light scattering method.

[7] The aqueous pigment dispersion liquid according to any one of [1] to [6], wherein a content of the pigment is 10 to 40% by mass, and a content of the dispersant is 5 to 60% by mass based on the content of the pigment.

[8] The aqueous pigment dispersion liquid according to any one of [1] to [7], wherein the pigment is Pigment Yellow 185, and a content of the pigment is 20 to 40% by mass.

Advantageous Effects of Invention

According to the present invention, an aqueous pigment dispersion liquid being such that a pigment is finely dispersed, and the viscosity, and the particle diameters of the pigment are unlikely to fluctuate, being excellent in storage stability, and enabling preparation of an emulsion-polymerized toner having properly controlled particle diameters while improving the pigment utilization rate can be provided.

DESCRIPTION OF EMBODIMENTS

<Aqueous Pigment Dispersion Liquid>

Hereinafter, embodiments of the present invention will be described, but the present invention is not limited to the following embodiments. The aqueous pigment dispersion liquid of the present invention is an aqueous pigment dispersion liquid that is useful as one of the raw materials in producing an emulsion-polymerized toner. The emulsion-polymerized toner can be produced by a conventionally known method for producing a toner, utilizing emulsion polymerization. Specifically, the production method includes a method of obtaining toner particles by increasing the temperature of an emulsion prepared using a nonionic surfactant to the clouding point of the nonionic surfactant or higher to insolubilize the nonionic surfactant to water and allow the emulsion particles to aggregate, and the like. Besides, the production method includes: a method of depositing toner particles by adding a salt; a method of depositing toner particles by adding an acid or a base; a method of depositing toner particles by adding a poor solvent; and the like. Among others, the aqueous pigment dispersion liquid of the present invention is suitable as one of the raw materials in producing an emulsion-polymerized toner by a method of utilizing a clouding point or a method of adding a salt. That is, the dispersant that is used for the aqueous pigment dispersion liquid of the present invention and is for dispersing a pigment is designed is such a way as to be capable of finely dispersing the pigment at a high concentration in a stable manner and suitable for a method for producing an emulsion-polymerized toner.

That is, the aqueous pigment dispersion liquid of the present invention is an aqueous pigment dispersion liquid containing: a pigment; a dispersant that disperses the pigment; and an aqueous medium containing water. The dispersant is a polymer containing: a constitutional unit (A) derived from a monomer (A); and a constitutional unit (B) derived from a monomer (B). The monomer (A) is a monomer such that a group containing a (meth)acryloyloxy group or a (meth)acryloylamino group is bonded to one end of any one of the following molecular chains of (i) to (iii). In addition, the monomer (B) is a monomer having a carboxy group or an amino group.

(i) a polyethylene glycol chain having an average number of repeating oxyethylene units n of 4 to 20

(ii) a polyethylene glycol monoalkyl (C1-18) ether chain having an average repeating oxyethylene units n of 4 to 20

(iii) a molecular chain represented by the following formula (1), the molecular chain having an average number of repeating oxyethylene oxypropylene units n of 20 to 50 and a content of an oxyethylene unit of 70 to 92% by mass $$R—(OEt)_x-(OPr)_y-A \qquad (1)$$

wherein R represents a C1-18 alkyl group, A represents OH or $NH_2$, Et represents an ethylene group, Pr represents a propylene group, and x+y=n.

In the polymer that is used as the dispersant, the content of an oxyethylene unit derived from the monomer (A) is 50 to 90% by mass based on the total mass of the polymer, and the polymer has a number average molecular weight in terms of polystyrene of 4,000 to 15,000, as measured by gel permeation chromatography (GPC). In addition, the polymer is contained in a state of being not ionized substantially in the aqueous pigment dispersion liquid. The aqueous pigment dispersion liquid has a pH at 25° C. of 3.0 to 8.4. Hereinafter, details on the aqueous pigment dispersion liquid of the present invention will be described.

(Monomer (A))

The dispersant for dispersing a pigment is a polymer containing a constitutional unit (A) derived from a monomer (A). The monomer (A) is a monomer such that a group containing a (meth)acryloyloxy group or a (meth)acryloylamino group is bonded to one end of any one of the previously mentioned molecular chains of (i) to (iii). The content of the oxyethylene unit derived from the monomer (A) in the polymer is 50 to 90% by mass based on the total mass of the polymer. The aqueous pigment dispersion liquid of the present invention using such a polymer as the dispersant for dispersing a pigment is suitable as an aqueous pigment dispersion liquid that is used as a raw material in producing an emulsion-polymerized toner. Among others, the aqueous pigment dispersion liquid of the present invention is particularly suitable as a pigment dispersion liquid that is used as a raw material in producing an emulsion-polymerized toner by the previously mentioned method utilizing a clouding point.

The polymer that is used as the dispersant contains an oxyalkylene unit (alkylene glycol chain), such as an oxyethylene unit or an oxypropylene unit, is highly hydrophilic, and therefore can be dissolved in water. In addition, with respect to the alkylene glycol chain, a hydrogen bond is usually cut at a particular temperature, which is determined according to the amount of the oxyethylene unit (average number of repetition n) and the molecular weight, to make the alkylene glycol chain insoluble to water. The particular temperature where the hydrogen bond is cut to make the alkylene glycol chain insoluble to water is a clouding point, and the polymer that is used as the dispersant has a clouding point. The clouding point is preferably 50 to 90° C. That is, with respect to the polymer that is used as the dispersant in the aqueous pigment dispersion liquid of the present invention, the type, the molecular weight, the composition, and the content of the oxyethylene unit, and the like of the alkylene glycol chain are controlled in such a way that the polymer has a predetermined clouding point.

Specific examples of the molecular chain, such as the glycol chains of (i) and (ii), include a polyethylene glycol chain, a polyethylene glycol monomethyl ether chain, a polyethylene glycol monobutyl ether chain, a polyethylene glycol monododecyl ether chain, a polyethylene glycol monooctadecyl ether chain, and a polyethylene glycol monooleyl ether chain, each having an average molecular weight of about 160 to about 1,000.

The molecular chain of (iii) represented by the formula (1) has an average molecular weight of preferably about 1,000 to about 2,000, and has oxyethylene unit:oxypropylene unit (molar ratio) of preferably 1:1 to 11:1. In addition, each of the arrangements of "OEt" (oxyethylene unit) and "OPr" (oxypropylene unit) in the formula (1) may be a random arrangement or a block arrangement. It is to be noted that specific examples of the C1-18 alkyl group represented by R in formula (1) include a methyl group, a propyl group, a butyl group, a dodecyl group, and an octadecyl group.

The content of the oxyethylene unit derived from the monomer (A) in the polymer is 50 to 90% by mass, and preferably 50 to 70% by mass based on the total mass of the polymer. When the content of the oxyethylene unit is too small, the polymer is insoluble to water and does not function as a dispersant. On the other hand, when the content of the oxyethylene unit is too large, water-solubility of the polymer is too high, and the clouding point does not appear, making it difficult to use the polymer for producing an emulsion-polymerized toner.

Among the molecular chains of (i) to (iii), the molecular chain of (iii) is preferable because it has a large molecular weight and has a higher effect of suppressing the aggregation of pigments due to the steric hindrance, and therefore the storage stability of the aqueous pigment dispersion liquid is further improved. The content of the oxyethylene unit, the average number of repeating oxyethylene units n, and the like in these molecular chains can also be calculated from, for example, proton ratios by $^1$H-NMR.

The monomer (A) is a monomer such that a group (polymerizable group) containing a (meth)acryloyloxy group or a (meth)acryloylamino group is bonded to one end of any one of the molecular chains of (i) to (iii). When the polymerizable group bonded to one end of the molecular chain is a vinyl group or an allyl group, polymerization is insufficient, and the polymerizable group is likely to be left. The polymerizable group is preferably a methacryloyloxy group or a methacryloylamino group.

The molecular chain, and the (meth)acryloyloxy group or the (meth)acryloylamino group may be directly bonded, but may be bonded with another organic group interposed therebetween. For example, a urethane bond or a urea bond may be interposed by reacting (meth)acryloyloxyethyl isocyanate with a hydroxy group (OH group) or an amino group (NH$_2$ group) at an end of the molecular chain. In addition, a hydroxy group and an amino group may be formed by subjecting glycidyl methacrylate to ring-opening reaction with an amino group (NH$_2$ group) at an end of the molecular chain.

(Monomer (B)) The polymer that is used as the dispersant contains a constitutional unit (B) derived from a monomer (B). The monomer (B) is a monomer having a carboxy group or an amino group. By using the monomer (B), the carboxy group, which is an acid group, or the amino group, which is a basic group, can be introduced in the molecular skeleton of the polymer that is used as the dispersant.

With respect to the polymer in which a carboxy group or an amino group is introduced, these groups form a hydrogen bond or an ionic bond with a pigment, and therefore the polymer easily adsorbs to the surface of the pigment. For this reason, by using as the dispersant the polymer in which a carboxy group or an amino group is introduced, the dispersibility of the aqueous pigment dispersion liquid to finely disperse a pigment and the storage stability of the aqueous pigment dispersion liquid can be improved. It is preferable to use each of the carboxy group and the amino group properly according to the characteristics (acidity, basicity) of the surface of the pigment. When a pigment having an acidic surface is intended to be dispersed, a basic polymer containing a constitutional unit (B) derived from a monomer (B) having an amino group is preferably used as the dispersant. On the other hand, when a pigment having a basic surface is intended to be dispersed, an acidic polymer containing a constitutional unit (B) derived from a monomer (B) having a carboxy group is preferably used as the dispersant.

The carboxy group or the amino group introduced in the polymer is preferably not neutralized so as not to be ionized. That is, the polymer that is used as the dispersant is contained in a state of being not ionized substantially in the aqueous pigment dispersion liquid. When the carboxy group or the amino group is neutralized to be water-dissociable, the polymer that functions as the dispersant dissolves in water, making it difficult to deposit toner particles even if the temperature is increased to the clouding point or higher. It is to be noted that it is not preferable to introduce both of the carboxy group and the amino group in the polymer because either one of the two is ionized. Moreover, when an acidic group, such as a sulfonate group and a phosphate group, is introduced in place of the carboxy group in the polymer, the polymer dissolves in water in some cases because these groups are highly hydrophilic even if they are not neutralized. For this reason, the acidic group of the monomer (B) is preferably a carboxy group.

Among the monomers (B), examples of the monomer having a carboxy group include: (meth)acrylic acid; acidic group-containing methacrylates obtained by reacting a polybasic acid, such as succinic acid, maleic acid, phthalic acid, and trimellitic acid, with a hydroxy group-containing (meth) acrylate, such as 2-hydroxyethyl (meth)acrylate; and acid group-containing methacrylates obtained by reacting a polybasic acid with an epoxy group-containing methacrylate, such as glycidyl (meth)acrylate. Among others, (meth) acrylic acid is preferable because it does not have an ester bond and is unlikely to hydrolyze in an aqueous pigment dispersion liquid.

Among the monomers (B), examples of the monomer having an amino group include 2-vinylpyridine, 4-vinylpyridine, vinylimidazole, dimethylaminoethyl (meth)acrylate, diethylaminoethyl (meth)acrylate, t-butylaminoethyl (meth) acrylate, amino group-containing monomers obtained by reacting ammonia, dimethylamine, or the like with glycidyl (meth)acrylate, and monomers obtained by reacting a compound having a primary or secondary amino group, and a tertiary amino group with (meth)acryloyloxyethyl isocyanate. The aqueous pigment dispersion liquid has a pH of 3.0 to 8.4 (within a range of acidity to weak alkalinity). When the basicity of the amino group is too strong, a resultant aqueous pigment dispersion liquid is likely to have pH that is out of the above-described range. Therefore, the monomer (B) is preferably at least one selected from the group consisting of vinylpyridine, vinylimidazole, and dimethylaminoethyl (meth)acrylate each having a weakly basic amino group.

The content of the constitutional unit (B) derived from the monomer (B) in the polymer is preferably 3 to 15% by mass, and more preferably 5 to 10% by mass based on the total mass of the polymer. When the content of the constitutional unit (B) in the polymer is less than 3% by mass, the adsorption force of the polymer to the surface of a pigment is likely to lower, so that the dispersion stability of the pigment is somewhat impaired in some cases. On the other hand, when the content of the constitutional unit (B) in the polymer exceeds 15% by mass, the hydrophilicity of the polymer is likely to be enhanced, making it difficult to deposit toner particles in some cases even if the temperature is increased to the clouding point or higher. In addition, when the content of the constitutional unit (B) in the polymer is to large, the aqueous pigment dispersion liquid is likely to have excessively high pH.

(Monomer (C))

If necessary, the polymer that is used as the dispersant may further contain a constitutional unit (C) derived from a monomer that is a monomer other than the monomer (A) and the monomer (B). The monomer (C) is preferably a monomer having neither an acidic group, a basic group, nor a reactive group, such as an isocyanate group and an epoxy group. Examples of the monomer (C) include: vinyl-based monomers, such as styrene, vinyl toluene, vinyl acetate, vinylpyrrolidone, and vinyl chloride; (meth)acrylates, such as methyl (meth)acrylate and lauryl (meth)acrylate; amide-based monomers, such as (meth)acrylamide and dimethyl (meth)acrylamide; and (meth)acrylonitrile.

(Structure and Physical Properties of Polymer)

The polymer may be any of (1) a random copolymer and (2) a block copolymer. However, the polymer preferably has a polymer structure in which polymer blocks each mainly containing a constitutional unit derived from each monomer are connected, and functions are separated into a part that dissolves in water and a part that adsorbs to a pigment. That is, the polymer that is used as the dispersant is preferably a block copolymer having a polymer block A containing a constitutional unit (A) and a polymer block B containing a constitutional unit (B). Further, the polymer is preferably (2-1) an A-B block copolymer; (2-2) an A-B-A block copolymer, or (2-3) a graft copolymer such that the polymer block B is a main chain, and the polymer block A is grafted onto the main chain. The polymer having any one of the structures of (2-1) to (2-3) is such that functions are separated for every block, and therefore, for example, the polymer block B strongly adsorbs to the surface of the pigment, and the polymer block A dissolves in an aqueous medium, thereby the dispersion stability can further be improved while the aggregation of pigment particles are further suppressed due to the steric hindrance.

The polymer has a number average molecular weight (Mn) in terms of polystyrene of 4,000 to 15,000, preferably 4,500 to 14,000, and more preferably 5,000 to 13,000, as measured by gel permeation chromatography (GPC). When the polymer has an Mn less than 4,000, the effect of improving the dispersion stability of the aqueous pigment dispersion liquid is somewhat deteriorated in some cases. On the other hand, when the polymer has an Mn exceeding 15,000, the viscosity of the aqueous pigment dispersion liquid increases excessively in some cases.

The molecular weight of the polymer is preferably uniform to some extent. Specifically, the polymer preferably has a PDI (molecular weight distribution=weight average molecular weight (Mw)/number average molecular weight (Mn)) of 2.5 or less.

(Method for Producing Polymer)

The polymer that is used as the dispersant can be produced by a conventionally known polymerization method, such as a radical polymerization method and an ionic polymerization method. Among others, the polymer is preferably produced by a radical polymerization method because the steps are simple. In the case of random copolymerization, monomers and a radical generating agent are heated under stirring to perform polymerization preferably in a solvent. The A-B block copolymer and the A-B-A block copolymer are preferably produced by a living radical polymerization method because the structures can strictly be controlled. Examples of the living radical polymerization method include a method using a nitroxide, an atom transfer radical polymerization method, a reversible addition-fragmentation chain transfer polymerization method, and a TERP method using organotellurium or the like as an initiating group. Among others, a reversible chain transfer catalyzed polymerization method, in which an iodine compound is used as an initiating compound, and an organic compound is used as a catalyst, is preferable because it is a method that needs neither an organic metal nor a special compound.

In the reversible chain transfer catalyzed polymerization method, a radically polymerizable group, such as a vinyl group, an acrylic group, and a methacrylic group, can be used. Among others, the methacrylic group is preferably used because the structure can thereby be controlled under a relatively calm condition. That is, the monomer (A) such that a group containing a methacryloyloxy group or a methacryloylamino group is bonded to one end thereof is preferably used.

The graft copolymer such that a polymer block B is a main chain, and a polymer block A is grafted onto the main chain can be produced by, for example, preparing in advance the polymer block A (macromonomer) having a radically polymerizable group at an end thereof, and copolymerizing this macromonomer and the monomer (B). The macromonomer can be produced by, for example, using a chain transfer agent having a hydroxy group or a carboxy group to introduce any one of these functional groups at the end, and then reacting glycidyl (meth)acrylate, (meth)acryloyloxyethyl isocyanate, or the like with the functional group. In addition, a chain transfer agent such as ethyl (bromomethyl)acrylate can also be used.

The polymer is preferably produced by solution polymerization, by which the polymer can be taken out in a solution state. As the solvent that is used in the solution polymerization, a water-soluble organic solvent is preferable. When the solution polymerization is performed using a water-soluble organic solvent, a polymerized product can be used as it is as a material for producing the aqueous pigment dispersion liquid even if a post-treatment is not performed after the completion of the polymerization. As the water-soluble organic solvent, alcohol-based solvents, such as ethanol and isopropanol; ether-based solvents, such as tetrahydrofuran; glycol-based solvents, such as propylene glycol monomethyl ether, diethylene glycol monobutyl ether, triethylene glycol monobutyl ether, and tripropylene glycol monomethyl ether; amide-based solvents, such as N-methylpyrrolidone, 3-methoxy-N,N'-dimethylpropionamide, and 3-butoxy-N,N-dimethylpropionamide; sulfur-based solvents, such as dimethyl sulfoxide; urea-based solvents, such as tetramethylurea and dimethyl imidazolidinone; and the like can be used. Among others, glycol-based solvents are preferable because the glycol-based solvents can enhance the wettability to a pigment and allow the dispersion to progress. After the solution polymerization is completed, the polymer can also be isolated for use by removing the solvent or depositing the polymer in a poor solvent, or by other methods.

(Pigment)

As the pigment, conventionally known pigments of a yellow color, a red color, a blue color, a green color, violet, a black color, and the like can be used. Examples of the pigment include: Pigment Yellow 14, 17, 74, 83, 93, 139, 150, 155, 180, and 185; Pigment Red 5, 48:2, 48:3, 57:1, 113, 122, 146, 147, 150, 184, 202, 238, 245, 254, 255, 269, and 282; Pigment Blue 15, 15:3, 15:4, 15:6, and 60; Pigment Violet 19; and Pigment Black 7. These pigments can be used singly, or two or more of these pigments can be used in combination. Further, a surface-treated pigment obtained by treating any of these pigments with a pigment treatment agent or a pigment derivative, and the like can also be used. Among the pigments, Pigment Red 122, Pigment Violet 19, Pigment Yellow 74 and 185, Pigment Blue 15:3, and Pigment Black 7 are preferable from the viewpoint of the hue, the chroma, the price, and the like.

Pigment Yellow 74 is a general-purpose pigment as a yellow pigment. On the other hand, when the light resistance, the influence on the environment, and the like are taken into consideration, Pigment Yellow 185, which is represented by the following formula (1), is preferably used as a substitute for Pigment Yellow 74. It is to be noted that Pigment Yellow 185 is a pigment having low alkali resistance such that coloration into an orange color occurs by dissolution under an alkaline condition. Further, the surface of Pigment Yellow 185 is hydrophilic, and therefore, in the past, Pigment Yellow 185 has been one of the pigments that are difficult to disperse in an aqueous medium through hydrophobic interaction using a dispersant. However, by using as the dispersant a predetermined polymer mentioned previously, Pigment Yellow 185, even when used at a high concentration, can finely be dispersed in a satisfactory state, and the aqueous pigment dispersion liquid also excellent in storage stability can be prepared.

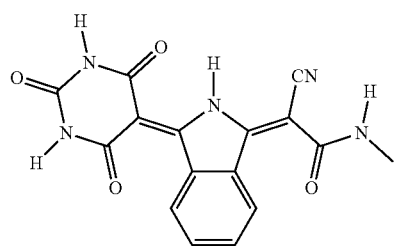

(1)

When Pigment Yellow 185 is used as the pigment, a polymer containing a constitutional unit (B) derived from a monomer (B) having an amino group is preferably used as the dispersant because the dispersibility of the pigment and the storage stability of the dispersion liquid can be enhanced. A skeleton similar to barbituric acid in the molecular structure of Pigment Yellow 185 decomposes by a base to form a neutralized salt, and Pigment Yellow 185 thereby dissolves, and therefore it is considered that Pigment Yellow 185 has low alkali resistance. Under such a circumstance, when the polymer containing a constitutional unit (B) derived from a monomer (B) having an amino group is used as the dispersant, it is considered that the amino group in the polymer forms an ionically neutralized structure together with Pigment Yellow 185, and the polymer in which the skeleton of Pigment Yellow 185 is introduced adsorbs to Pigment Yellow 185, so that the dispersibility is improved.

The content of the pigment in the aqueous pigment dispersion liquid is preferably 10 to 40% by mass, and more preferably 15 to 35% by mass. When the content of the pigment exceeds 40% by mass, the viscosity of the aqueous pigment dispersion liquid is likely to increase and the fluidity is likely to lower. Therefore, in some cases, it is somewhat difficult to produce the aqueous pigment dispersion liquid, and handling is difficult when an emulsion-polymerized toner is produced. On the other hand, when the content of the pigment is less than 10% by mass, it is somewhat disadvantageous in terms of economic efficiency. It is to be noted that by using the above-described particular polymer as the dispersant, even Pigment Yellow 185, which has so far been difficult to disperse, can be dispersed at a higher concentration. Therefore, when the pigment is Pigment Yellow 185, the content of the pigment in the aqueous pigment dispersion liquid is preferably 20 to 40% by mass, and more preferably 20 to 30% by mass.

The content of the dispersant in the aqueous pigment dispersion liquid is preferably set to 5 to 60% by mass, and more preferably 10 to 50% by mass based on the content of the pigment. When the content of the dispersant based on the content of the pigment is less than 5% by mass, it is difficult to micronize the pigment in the process of producing the aqueous pigment dispersion liquid in some cases. On the other hand, when the content of the dispersant based on the content of the pigment exceeds 60% by mass, the viscosity of the aqueous pigment dispersion liquid is likely to increase excessively, making it somewhat difficult to disperse the pigment, and it is somewhat disadvantageous in terms of economic efficiency.

(Characteristics of Aqueous Pigment Dispersion Liquid)

The aqueous pigment dispersion liquid has a pH at 25° C. of 3.0 to 8.4. When pH is set to this pH range, toner particles can easily be deposited when an emulsion-polymerized toner is produced. It is to be noted that when a pigment, such as Pigment Yellow 185, which is likely to dissolve or decompose under an alkaline condition, the aqueous pigment dispersion liquid is preferably within a range of acidic pH to neutral pH. More specifically, the aqueous pigment dispersion liquid preferably has a pH of 4.0 to 7.8, and more preferably 5.0 to 7.5. In general, ionic repulsion between pigment particles is less likely to occur within the above-described pH range, and therefore the dispersibility is deteriorated in some cases. Against this, the aqueous pigment dispersion liquid of the present invention uses the previously mentioned particular polymer as the dispersant and therefore is excellent in dispersibility of a pigment even within the above-described pH range.

The number average particle diameter of the pigment contained in a dispersed state in the aqueous pigment dispersion liquid is preferably 80 to 300 nm, and more preferably 100 to 200 nm. When the number average particle diameter of the pigment exceeds 300 nm, the coloring power, the chroma, the transparency, and the like of a toner are likely to deteriorate. On the other hand, it takes long hours to produce the aqueous pigment dispersion liquid having a number average particle diameter of the pigment of less than 80 nm, and therefore such a pigment is somewhat disadvantageous in terms of economic efficiency. Moreover, in some cases, it is difficult to control the particle diameters in the aggregation-and-fixation step in producing an emulsion-polymerized toner. The number average particle diameter of the pigment in the present specification is a number average particle diameter which is measured by a light scattering method using a dynamic light scattering particle size distribution analyzer or the like.

(Method for Producing Aqueous Pigment Dispersion Liquid)

The aqueous pigment dispersion liquid of the present invention can be produced according to a conventionally known method. For example, the dispersant (polymer), the pigment, and the aqueous medium are mixed, and if necessary, various additives are further added. A resultant mixture is homogenized as necessary to some extent with a stirrer, and is then subjected to a dispersion treatment using a disperser until the particle diameters of the pigment fall within a desired range. Thereby, the intended aqueous pigment dispersion liquid can be obtained. As the disperser, conventionally known dispersers, such as, for example, a kneader, an attritor, a ball mill, a sand mill using glass, zircon, or the like, a horizontal type of media disperser, a colloid mill, and a high-pressure homogenizer, can be used.

In the aqueous pigment dispersion liquid, various additives, such as, for example, a water-soluble solvent including ethylene glycol, propylene glycol, 1,3-butylene glycol, glycerin, and the like; a water-soluble polymeric substance including methyl cellulose, ethyl cellulose, carboxymethyl cellulose, polyethylene glycol, and the like; a nonionic surfactant, and besides, a known defoamer; and an antiseptic can appropriately be blended taking the wettability, the drying properties, the discharge properties, the fluidity, the viscosity, and the like into consideration.

The content of the various additives in the aqueous pigment dispersion liquid is usually 200% by mass or less, and preferably 100% by mass or less based on the content of the pigment. When the content of the various additives exceeds 200% by mass, the dispersant (polymer) adsorbed to the surface of the pigment is likely to be desorbed in some cases, so that the dispersion stability of the pigment is likely to lower in some cases.

The produced aqueous pigment dispersion liquid can be used as it is, or can be used after a foreign body and coarse particles which exist slightly are removed using a centrifuge, an ultracentrifuge, a filter, or the like. The foreign body and the coarse particles are preferably removed because the reliability of the aqueous pigment dispersion liquid can thereby be enhanced. It is to be noted that the viscosity of the aqueous pigment dispersion liquid may optionally be set according to the application.

For example, the aqueous pigment dispersion liquid of the present invention is mixed with an emulsified product (emulsion) of a binder resin, produced by emulsion polymerization, and, if necessary, mixed with other materials, such as a charge control agent, a magnetic substance, and a wax component, and predetermined operation, such as controlling the temperature, adjusting pH, or adding a salt, is then performed. Thereby, aggregation-and-fixation is performed in such a way as to obtain predetermined particle diameters, and thus the toner particles can be produced. Thereafter, by performing washing, filtration, drying, and the like, an emulsion-polymerized toner can be obtained.

EXAMPLES

Hereinafter, the present invention will be described specifically based on Examples, but the present invention is not limited to these Examples. It is to be noted that each of "parts" and "%" in Examples and Comparative Examples is on a mass basis unless otherwise noted.

<Production of Dispersant (Polymer)>

Production Example 1: Random Dispersant-1

In a separable flask provided with a stirring apparatus, a cooler, a thermometer, a nitrogen-introducing pipe, and a dropping apparatus, 100 parts of poly(ethylene glycol propylene glycol) monomethyl ether monoamine (EOPO-1) was placed and stirred. This "EOPO-1" was such that oxyethylene unit:oxypropylene unit=32:9 (molar ratio converted from NMR), n=41, the content of the oxyethylene unit (EO content) is 71.8%, the amine value is 27.6 mgKOH/g, and the average molecular weight calculated from the amine value is 2,031. It is to be noted that the content of EOPO-1 was calculated as a proportion (mass ratio (%)) of the molecular weight of the oxyethylene unit (=1,408) in the structural formula of EOPO-1 ($CH_3(OCH_2CH_2)_{32}$—$(OCH_2CHCH_3)_9$—$NH_2$, molecular weight=15+44×32+58×9+16=1,961). Hereinafter, the EO content was calculated from the molecular weight in the same manner.

Subsequently, a mixed liquid of 7.64 parts of methacryloyloxyethyl isocyanate (MOI) (trade name "Karenz MOI", manufactured by Showa Denko K.K.) and 7.64 parts of tetrahydrofuran (THF) was dropped into the flask over 1 hour. After disappearance of the isocyanate was ascertained using an infrared spectrophotometer (IR), the amine value was measured by the titration method, which will be described below. As a result, the amine value was almost 0 mgKOH/g, and therefore the amino group was scarcely left. From those described above, it was ascertained that a macromonomer such that a group containing a methacryloylamino group is bonded to one end of poly(ethylene glycol propylene glycol) monomethyl ether was produced.

[Titration Method (Measurement of Amine Value)]

With 20 parts of a toluene/ethanol mixed solvent (toluene:ethanol=3:2), 0.5 parts of a precisely weighed sample was diluted, and a resultant mixture was homogenized. The amine value (mgKOH/g) was measured and calculated by performing titration using bromophenol blue as an indicator, and a 0.1 mol/L ethanol solution of hydrochloric acid as a titrating solution.

Subsequently, after 146.7 parts of THF, 8.61 parts by 4-vinylpyridine (4VP), 17.6 parts of butyl methacrylate (BMA), and 1.5 parts of thioglycerol were added, and a resultant mixture was homogenized, 0.1 parts of azobis 2,4-dimethylvaleronitrile (V-65) (trade name "V-65", manufactured by FUJIFILM Wako Pure Chemical Corporation) was further added to perform polymerization at 65° C. for 8 hours and form a polymer, and thus a polymer solution was obtained. Part of the polymer solution was taken out for sampling to find that the polymer had a number average molecular weight (Mn) in terms of polystyrene of 11,300, as measured by gel permeation chromatography (GPC) using a 0.1 mmol/L dimethylformamide solution of lithium bromide as an eluent. In addition, the molecular weight distribution (weight average molecular weight (Mw)/number average molecular weight (Mn)=PDI) was 2.05. It is to be noted that the macromonomer used was not detected by GPC.

After 146.7 parts of water was added, and a resultant mixture was homogenized, THF was distilled away under reduced pressure, and water was further added to adjust the solid content of the polymer solution to 40.0%. pH (25° C.) as measured by diluting part of the polymer solution 10-hold with ion-exchanged water was 8.3. In addition, the polymer had an amine value of 33.7 mgKOH/g, and the EO content in the polymer was 53.0%. The obtained polymer was used as "random dispersant-1".

Production Examples 2-4: Random Dispersants-2 to 4

Polymer solutions containing random dispersants 2-4 respectively were prepared in the same manner as in previously mentioned Production Example 1, except that respective components of the types and in the amounts shown in Table 1 were used. In Table 1, "EOPO-2" represents poly (ethylene glycol propylene glycol) monomethyl ether monoamine, which was such that oxyethylene unit:oxypropylene unit=19:3 (molar ratio converted from NMR), the average number of repeating oxyethylene oxypropylene units n was 22, the oxyethylene unit content (EO content) was 80.3%, the amine value was 55.3 mgKOH/g, and the average molecular weight calculated from the amine value was 1,014.

TABLE 1

| Production Example | | 1 | 2 | 3 | 4 |
|---|---|---|---|---|---|
| Random dispersant | | -1 | -2 | -3 | -4 |
| Glycol chain monomer | Type | EOPO-1 | EOPO-1 | EOPO-2 | EOPO-1 |
| | Amount (parts) | 100 | 100 | 150 | 150 |
| MOI (parts) | | 7.64 | 7.64 | 22.95 | 11.45 |
| Monomer (B) | Type | 4VP | VIm | VIm | DMAEMA |
| | Amount (parts) | 8.61 | 8.61 | 8.61 | 8.61 |
| Monomer (C) | Type | BMA | BMA | MMA | BzMA |
| | Amount (parts) | 17.6 | 17.6 | 12.3 | 12.3 |
| Thioglycerol (parts) | | 1.5 | 1.5 | 1.5 | 3.0 |
| V-65 (parts) | | 0.1 | 0.1 | 0.1 | 0.15 |
| EO content (%) | | 53.0 | 53.0 | 61.7 | 58.5 |
| Mn | | 11,300 | 12,000 | 10,600 | 6,200 |
| PDI | | 2.05 | 2.13 | 2.30 | 2.34 |
| Solid content (%) | | 40.0 | 40.0 | 40.0 | 40.0 |
| pH | | 8.3 | 8.6 | 8.3 | 8.2 |
| Amine value (mgKOH/g) | | 33.7 | 75.2 | 52.5 | 16.7 |

TABLE 1-continued

| Production Example | 1 | 2 | 3 | 4 |
|---|---|---|---|---|

VIm: vinylimidazole
DMAEMA: dimethylaminoethyl methacrylate
BMA: butyl methacrylate
MMA: methyl methacrylate
BzMA: benzyl methacrylate Production Example 5: Random Dispersant-5

In a flask which is the same as the one used in Production Example 1, 100 parts of EOPO-1 was placed and stirred. Subsequently, a mixed liquid of 7.59 parts of methacrylic anhydride and 7.59 parts of THF was dropped into the flask over 1 hour, and a resultant mixture was reacted under stirring at 5000 for 2 hours. After disappearance of the acid anhydride was ascertained using IR, the acid value was measured by the titration method, which will be described below. As a result, the acid value in the system was 23.9 mgKOH/g, and the acid value converted by excluding the THF content was 25.6 mgKOH/g. From those described above, it was ascertained that a macromonomer such that a group containing a methacryloylamino group is bonded to one end of poly(ethylene glycol propylene glycol) monomethyl ether was produced.

[Titration Method (Measurement of Acid Value)]

With 20 parts of a toluene/ethanol mixed solvent (toluene: ethanol=3:2), 0.5 parts of a precisely weighed sample was diluted, and a resultant mixture was homogenized. The acid value (mgKOH/g) was measured and calculated by performing titration using phenolphthalein as an indicator, and a 0.1 mol/L ethanol solution of potassium hydroxide as a titrating solution.

After 151.69 parts of THF, 4.23 parts of acrylic acid (AA), 17.6 parts of MMA, and 1.5 parts of thioglycerol were added, and a resultant mixture was homogenized, 0.1 parts of V-65 was further added to perform polymerization at 65° C. for 8 hours and form a polymer, and thus a polymer solution was obtained. The polymer had an Mn of 13,000 and a PDI of 1.98. It is to be noted that the macromonomer used was not detected by GPC. After water was added, and a resultant mixture was homogenized, THF was distilled away under reduced pressure, and water was further added to adjust the solid content of the polymer solution to 40.0%. pH (25° C.) as measured by diluting part of the polymer solution 10-hold with ion-exchanged water was 3.6. In addition, the polymer had an acid value of 45.3 mgKOH/g, and the EO content in the polymer was 56.8%. The obtained polymer was used as "random dispersant-5".

Production Example 6: Block Dispersant-1

In a flask which is the same as the one used in Production Example 1, 185.1 parts of tripropylene glycol monomethyl ether (TPME), 532.0 parts of polyethylene glycol monomethacrylate (PEGMA) (n=4, EO content 67.1%), 71.7 parts of BMA, 9.1 parts of iodine, 33.3 parts of 2,2-azobis(4-methoxy-2,4-dimethylvaleronitrile) (V-70) (trade name "V-70", manufactured by FUJIFILM Wako Pure Chemical Corporation), and 0.5 parts of N-iodosuccinimide were placed. After the contents were stirred and homogenized, the temperature was increased to 45° C. to perform polymerization for 5 hours and form a polymer block A. The polymer block A had an Mn of 8,200 and a PDI of 1.15. It is to be noted that PEGMA used was not detected by GPC. In addition, the polymerization rate was about 100%.

Subsequently, 70.7 parts of dimethylaminoethyl methacrylate (DMAEMA) was added to perform polymerization at 45° C. for 8 hours and form a polymer block B, and thus a polymer solution containing a polymer was obtained. The polymer had an Mn of 9,300 and a PDI of 1.23. In addition, the polymerization rate was about 100%. Water was added to adjust the solid content of the polymer solution to 40.0%. The polymer solution had a pH (25° C.) of 8.3. The polymer had an amine value of 37.5 mgKOH/g, and the EO content in the polymer was 52.9%. The obtained polymer (A-B block copolymer) was used as "block dispersant-1".

Production Example 7: Block Dispersant-2

In a flask which is the same as the one used in Production Example 1, 120.0 parts of diethylene glycol dimethyl ether (DMDG), 80 parts of polyethylene glycol monomethyl ether acrylate (PEGMEA400) (n=9, EO content 82.1% by mass), 25.6 parts of butyl acrylate (BA), and 1.6 parts of N-tert-butyl-N-(2-methyl-1-phenylpropyl)-O-(1-phenylethyl) hydroxylamine (manufactured by Sigma Aldrich Co. LLC) were placed. A resultant mixture was heated to 130° C. over 1 hour under a nitrogen gas flow. The reaction system was retained at 130° C. to perform polymerization for 5 hours and form a polymer block A. The polymer block A had an Mn of 8,600 and a PDI of 1.23, and the polymerization rate was about 100%.

Subsequently, 12.6 parts of 2-vinylpyridine was added to perform polymerization for 3 hours and form a polymer block B, and thus a polymer solution containing a polymer was obtained. The polymer had an Mn of 11,200 and a PDI of 1.21. In addition, the polymerization was about 100%. Water was added to adjust the solid content of the polymer solution to 40.0%. The polymer solution had a pH (25° C.) of 7.6. The polymer had an amine value of 56.9 mgKOH/g, and the EO content in the polymer was 55.5% by mass. The obtained polymer (A-B block copolymer) was used as "block dispersant-2".

Production Example 8: Block Dispersant-3

In a flask which is the same as the one used in Production Example 1, 243.8 parts of diethylene glycol monobutyl ether (BDG), 3.632 parts of ethylene glycol di(2-(2-iodoisobutyryloxy)), 31.4 parts of DMAEMA, 8.8 parts of BzMA, 1.84 parts of dimethyl 2,2'-azobis(2-methylpropionate) (V-601) (trade name "V601", manufactured by FUJIFILM Wako Pure Chemical Corporation), and 0.16 parts of diphenyl methane were placed. The temperature was increased to 85° C. to perform polymerization for 8 hours and form a polymer block B. The polymer block B had an Mn of 3,400 and a PDI of 1.13. Subsequently, 198.4 parts of polyethylene glycol monomethyl ether methacrylate (PEGMEMA400) (n=9, EO content 79.8%) was added to perform polymerization for 8 hours and form a polymer block A at both ends of the polymer block B, and thus a polymer solution containing a polymer was obtained. The polymer had an Mn of 10,200 and a PDI of 1.46. In addition, the polymerization was about 100%. Water was added to adjust the solid content of the polymer solution to 40.0%. The polymer solution had a pH (25° C.) of 8.4. The polymer had an amine value of 45.0 mgKOH/g, and the EO content in the polymer was 65.4%. The obtained polymer (A-B-A block copolymer) was used as "block dispersant-2".

Production Example 9: Graft Dispersant-1

In a flask which is the same as the one used in Production Example 1, 187.5 parts of BDG, 7.5 parts of ethyl (bromomethyl)acrylate (EBMA), 108 parts of PEGMEMA400, 12 parts of MMA, and 0.75 parts of V-65 were placed to perform polymerization at 70° C. for 10 hours and form a polymer block A to be a graft chain. The polymer block A had an Mn of 3,200 and a PDI of 1.51. Subsequently, 15 parts of VIm, 15 parts of BzMA, and 3.0 parts of t-butylperoxy-2-ethylhexanoate (trade name "PERBUTYL O", manufactured by NOF CORPORATION) were added to perform polymerization at 90° C. for 10 hours, and thus a polymer solution containing a polymer (B-g-A polymer) such that the polymer block A is grafted onto the polymer block B was obtained. The polymer had an Mn of 5,200 and a PDI of 1.86. Water was added to adjust the solid content of the polymer solution to 40.0%. The polymer solution had a pH (25° C.) of 8.0. The polymer had an amine value of 56.0 mgKOH/g, and the EO content in the polymer was 54.7%. The obtained polymer (B-g-A polymer) was used as "graft dispersant-1".

Production Example 10: Graft Dispersant-2

A polymer solution containing a polymer (B-g-A polymer) such that the polymer block A is grafted onto the polymer block B was obtained in the same manner as in previously mentioned Production Example 9, except that 4VP was used in place of VIm. The polymer block A had an Mn of 3,000 and a PDI of 1.52. In addition, the polymer had an Mn of 6,100 and a PDI of 1.73. The polymer solution had a pH (25° C.) of 4.9 and a solid content of 40.0%. In addition, the polymer had an amine value of 35.6 mgKOH/g, and the EO content in the polymer was 56.0%. The obtained polymer (B-g-A polymer) was used as "graft dispersant-2".

Production Example 11: Graft Dispersant-3

A polymer solution containing a polymer (B-g-A polymer) such that the polymer block A is grafted onto the polymer block B was obtained in the same manner as in previously mentioned Production Example 8, except that methacrylic acid (MA) was used in place of VIm, and 2-ethylhexyl acrylate (EHA) was used in place of BzMA. The polymer block A had an Mn of 3,200 and a PDI of 1.49. In addition, the polymer had an Mn of 5,700 and a PDI of 1.93. The polymer solution had a pH (25° C.) of 4.6 and a solid content of 40.0%. In addition, the polymer had an acid value of 62.1 mgKOH/g, and the EO content in the polymer was 56.0%. The obtained polymer (B-g-A polymer) was used as "graft dispersant-3".

Comparative Production Example 1: Random Comparative Dispersant-1

A polymer solution containing a polymer was obtained in the same manner as in previously mentioned Production Example 1, except that 4VP was not used, and the amount of BMA was increased by the amount corresponding to the amount of 4VP used in Production Example 1. The polymer had an Mn of 12,300 and a PDI of 2.01. The polymer solution had a pH (25° C.) of 7.8 and a solid content of 40.0%. In addition, the polymer had an amine value of 0 mgKOH/g, and the EO content in the polymer was 53.0%. The obtained polymer was used as "random comparative dispersant-1".

Comparative Production Example 2: Random Comparative Dispersant-2

A polymer solution containing a polymer was obtained in the same manner as in previously mentioned Production Example 1, except that the amount of EOPO-1 was changed to 70 parts, the amount of MOI was changed to 5.34 parts, and the amount of BMA was changed to 49.9 parts. The polymer had an Mn of 14,300 and a PDI of 2.30. The polymer solution had a pH (25° C.) of 8.4 and a solid content of 40.2%. In addition, the polymer had an amine value of 33.7 mgKOH/g, and the EO content in the polymer was 37.8%. The obtained polymer was used as "random comparative dispersant-2".

Comparative Production Example 3: Block Comparative Dispersant

A polymer solution containing a polymer was obtained in the same manner as in previously mentioned Production Example 6, except that polyethylene glycol monomethyl ether monomethacrylate (PEGMEMA1000) (n=23, EO content 91.0%) was used in place of PEGMA. The polymer block A had an Mn of 7,300 and a PDI of 1.14. In addition, the polymer had an Mn of 8,300 and a PDI of 1.34. The polymer solution had a pH (25° C.) of 8.3 and a solid content of 40.0%. In addition, the polymer had an amine value of 37.6 mgKOH/g, and the EO content in the polymer was 71.0%. The obtained polymer (A-B block copolymer) was used as "block comparative dispersant".

Comparative Production Example 4: Graft Comparative Dispersant-1

A polymer solution containing a polymer (B-g-A polymer) such that the polymer block A is grafted onto the polymer block B was obtained in the same manner as in previously mentioned Production Example 9, except that the amount of t-butylperoxy-2-ethylhexanoate (PERBUTYL O) was changed to 0.5 parts. The polymer had an Mn of 16,300 and a PDI of 2.39. The polymer solution had a pH (25° C.) of 4.6 and a solid content of 40.0%. In addition, the polymer had an acid value of 61.8 mgKOH/g, and the EO content in the polymer was 56.0%. The obtained polymer (B-g-A polymer) was used as "graft comparative dispersant-1".

Comparative Production Example 5: Graft Comparative Dispersant-2

A polymer solution containing a polymer (B-g-A polymer) such that the polymer block A is grafted onto the polymer block B was obtained in the same manner as in previously mentioned Production Example 9, except that an aqueous solution of sodium hydroxide equimolar to methacrylic acid was added after the completion of the polymerization to neutralize the carboxy group derived from methacrylic acid into a sodium salt. The polymer before the neutralization had an Mn of 4,400 and a PDI of 1.78. The polymer solution had a pH (25° C.) of 9.8 and a solid content of 40.0%. In addition, the polymer had an acid value of 62.1 mgKOH/g, and the EO content in the polymer was 56.0%. The obtained polymer (B-g-A polymer) was used as "graft comparative dispersant-2".

<Production (1) of Aqueous Pigment Dispersion Liquid>

Examples 1 to 4

Each component shown in Table 2 was charged with a horizontal type of bead mill filled with zirconia beads of 0.1 mm and dispersed. Subsequently, a resultant dispersion liquid was filtrated sequentially with a membrane filter of 1 μm and a membrane filter of 0.5 μm, and thus aqueous pigment dispersion liquids of respective colors were obtained. pH, the viscosity (mPa·s), and the number average particle diameter (nm) of the pigment at 25° C. were measured for the obtained aqueous pigment dispersion liquids. The viscosity was measured using a BL type viscometer under a condition of the number of revolutions of 60 rpm. The number average particle diameter of the pigment was measured using a dynamic light scattering particle size distribution analyzer (trade name "NICOMP380ZLS-S", manufactured by Nihon Entegris G.K.). In addition, pH, the viscosity (mPa·s), and the number average particle diameter (nm) of the pigment at 25° C. after storing the obtained aqueous pigment dispersion liquids at 50° C. for 1 week were measured. Results are shown in Table 2.

TABLE 2

| Example | 1 | 2 | 3 | 4 |
|---|---|---|---|---|
| Sample name | Aqueous cyan dispersion liquid-1 | Aqueous yellow dispersion liquid-1 | Aqueous magenta dispersion liquid-1 | Aqueous black dispersion liquid-1 |
| Pigment Blue 15:3 (parts) | 25 | | | |
| Pigment Yellow 74 (parts) | | 20 | | |
| Pigment Red 122 (parts) | | | 22 | |
| Pigment Black 7 (parts) | | | | 30 |
| Solution of random dispersant-1 (parts) | 19 | 15 | 27.5 | 30 |

TABLE 2-continued

| Example | 1 | 2 | 3 | 4 |
|---|---|---|---|---|
| Glycerin (parts) | 5 | 5 | 5 | 5 |
| Water (parts) | 51 | 60 | 45.5 | 35 |
| Total (parts) | 100 | 100 | 100 | 100 |
| pH | 8.0 | 8.0 | 7.9 | 7.6 |
| Viscosity (mPa · s) | 10.5 | 10.4 | 10.5 | 10.3 |
| Number average particle diameter of pigment (nm) | 102 | 89 | 120 | 83 |
| pH after storage | 8.0 | 7.9 | 8.0 | 7.5 |
| Viscosity after storage (mPa · s) | 10.3 | 10.3 | 10.4 | 10.2 |
| Number average particle diameter of pigment after storage (nm) | 98 | 86 | 122 | 84 |

Pigment Blue 15:3: trade name "CYANINE BLUE 4920", manufactured by Dainichiseika Color & Chemicals Mfg. Co., Ltd.
Pigment Yellow 74: trade name "SEIKAFAST YELLOW 2015", manufactured by Dainichiseika Color & Chemicals Mfg. Co., Ltd.
Pigment Red 122: trade name "SEIKAFAST RED 130P", manufactured by Dainichiseika Color & Chemicals Mfg. Co., Ltd.
Pigment Black 7: trade name "M1000", manufactured by Mitsubishi Chemical Corporation Examples 5 to 10

Aqueous pigment dispersion liquids were obtained in the same manner as in previously mentioned Examples 1 to 4, except that the combinations shown in Table 3 were adopted. pH, the viscosity (mPa·s), and the number average particle diameter (nm) of the pigment at 25° C. were measured for the obtained aqueous pigment dispersion liquids. In addition, pH, the viscosity (mPa·s), and the number average particle diameter (nm) of the pigment at 25° C. after storing the obtained aqueous pigment dispersion liquids at 50° C. for 1 week were measured. Results are shown in Table 3.

TABLE 3

| Example | 5 | 6 | 7 | 8 | 9 | 10 |
|---|---|---|---|---|---|---|
| Pigment Blue 15:3 (parts) | 25 | 25 | 25 | 25 | 25 | 25 |
| Solution of random dispersant-2 (parts) | 19 | | | | | |
| Solution of random dispersant-4 (parts) | | 19 | | | | |
| Solution of block dispersant-1 (parts) | | | 19 | | | |
| Solution of block dispersant-2 (parts) | | | | 19 | | |
| Solution of block dispersant-3 (parts) | | | | | 19 | |
| Solution of graft dispersant-1 (parts) | | | | | | 19 |
| Glycerin (parts) | 5 | 5 | 5 | 5 | 5 | 5 |
| Water (parts) | 51 | 51 | 51 | 51 | 51 | 51 |
| Total (parts) | 100 | 100 | 100 | 100 | 100 | 100 |
| pH | 7.6 | 8.2 | 8.3 | 8 | 8.3 | 7.1 |
| Viscosity (mPa · s) | 12.3 | 10.5 | 10.7 | 10.6 | 8.6 | 8.3 |
| Number average particle diameter of pigment (nm) | 89 | 112 | 115 | 105 | 100 | 120 |
| pH after storage | 7.7 | 8.3 | 8.1 | 7.9 | 8.3 | 7.0 |
| Viscosity after storage (mPa · s) | 11.3 | 10.2 | 10.2 | 10.2 | 9.3 | 8.1 |
| Number average particle diameter of pigment after storage (nm) | 92 | 111 | 115 | 102 | 102 | 131 |

Comparative Examples 1 to 4

Aqueous pigment dispersion liquids were obtained in the same manner as in previously mentioned Examples 1 to 4, except that the combinations shown in Table 4 were adopted. pH, the viscosity (mPa·s), and the number average particle diameter (nm) of the pigment at 25° C. were measured for the obtained aqueous pigment dispersion liquids. In addition, pH, the viscosity (mPa·s), and the number average particle diameter (nm) of the pigment at 25° C. after storing the obtained aqueous pigment dispersion liquids at 50° C. for 1 week were measured. Results are shown in Table 4. It is to be noted that comparative aqueous cyan dispersion liquid-3 of Comparative Example 3 turned into a gel-like state, so that the viscosity, and the number average particle diameter of the pigment were not able to be measured.

TABLE 4

| Comparative Example | 1 | 2 | 3 | 4 |
|---|---|---|---|---|
| Sample name | Comparative aqueous cyan dispersion liquid-1 | Comparative aqueous cyan dispersion liquid-2 | Comparative aqueous cyan dispersion liquid-3 | Comparative aqueous cyan dispersion liquid-4 |
| Pigment Blue 15:3 (parts) | 25 | 25 | 25 | 25 |
| Polyoxyethylene styrylphenyl ether (HLB 15.6) (parts) | 8 | | | |
| Sodium naphthalene sulfonate formaldehyde condensate (parts) | | 5 | | |
| Solution of random comparative dispersant-1 (parts) | | | 19 | |
| Solution of random comparative dispersant-2 (parts) | | | | 19 |
| Glycerin (parts) | 5 | 5 | 5 | 5 |
| Water (parts) | 62 | 65 | 51 | 51 |
| Total parts | 100 | 100 | 100 | 100 |
| pH | 6.8 | 5.1 | 7 | 8.1 |
| Viscosity (mPa · s) | 10.4 | 9.8 | Gel-like | 12.3 |
| Number average particle diameter of pigment (nm) | 89 | 92 | — | 113 |
| pH after storage | 6.7 | 5.3 | — | 8.1 |
| Viscosity after storage (mPa · s) | 15 | 9.6 | — | 35 |
| Number average particle diameter of pigment after storage (nm) | 135 | 93 | — | 153 |

<Production of Binder Emulsion for Emulsion-Polymerized Toner>

Production Example 12

In a flask which is the same as the one used in Production Example 1, 100 parts of water was placed, and a nitrogen gas was allowed to flow therein for 30 minutes. In another container, 76 parts of styrene, 20 parts of butyl acrylate, 4 parts of acrylic acid, and 3 parts of a polyethylene glycol alkenyl ether (trade name "LATEMUL PD-420", manufactured by Kao Corporation, HLB 12.6) were placed therein, and a resultant mixture was mixed to obtain a uniform monomer mixed solution. The resultant monomer mixed solution was placed in a dropping funnel. After the temperature in the flask was increased to 60° C., and 0.8 parts of potassium persulfate was added therein, the monomer mixed solution was dropped therein over 3 hours. After the dropping was completed, a resultant reaction liquid was subjected to aging at 60° C. for 10 hours to obtain an emulsion (binder emulsion) containing a toner binder resin having a glass transition temperature of about 54° C. The obtained binder emulsion had a solid content of 50.6% and a pH of 5.6. In addition, the number average particle diameter of particles in the binder emulsion was 200 nm.

<Production (1) of Emulsion-Polymerized Toner>

Application Experiment Example 1

A mixed liquid was obtained by mixing 100 parts of the binder emulsion and 5.5 parts (in terms of pigment content) of aqueous cyan dispersion liquid-1. The resultant mixed liquid was heated to 80° C. and retained at the temperature for 2 hours, and aggregated particles were then subjected to aging by heating the mixed liquid to 90° C. for 3 hours. The aggregate was subjected to filtration after cooling the mixed liquid, washed with ion-exchanged water, and was then dried to obtain cyan toner-1, which is an emulsion-polymerized toner.

Application Experiment Examples 2 to 4, and Application Experiment Examples—Comparison 1 and Comparison 2

Yellow toner-1, magenta toner-1, black toner-1, cyan toner-2, and cyan toner-3, which are emulsion-polymerized toners, were obtained in the same manner as in previously mentioned Application Experiment Example 1, except that aqueous pigment dispersion liquids shown in Table 5 were used respectively in place of aqueous cyan dispersion liquid-1.

<Evaluation (1) of Emulsion-Polymerized Toner>
(Pigment Utilization Performance)

The extent of coloration of a filtrate, the coloration having occurred in the process of producing an emulsion-polymerized toner, was observed to evaluate the pigment utilization performance (rate of pigment utilized) was evaluated according to the evaluation criteria described below. Results are shown in Table 5.
  Good: transparent
  Fair: colored slightly
  Poor: colored at the same level as the aqueous pigment dispersion liquid used
  (Proportions of Fine Particles and Coarse Particles)
  Volume average particle diameter (DV50 (μm)) was measured for the emulsion-polymerized toners using a particle size distribution analyzer (trade name "Coulter counter/Multisizer II" manufactured by Beckman Coulter, Inc.). Results are shown in Table 5. In addition, the proportions of fine particles (3 μm or less) and coarse particles (15 μm or more) were calculated to evaluate the proportions of the fine particles and the coarse particles according to the evaluation criteria described below. Results are shown in Table 5.
  Good: 1% or less
  Fair: more than 1% and 3% or less
  Poor: more than 3%

TABLE 5

| Application Experiment Example | 1 | 2 | 3 | 4 | Comparison 1 | Comparison 2 |
|---|---|---|---|---|---|---|
| Aqueous pigment dispersion liquid | Aqueous cyan dispersion liquid-1 | Aqueous yellow dispersion liquid-1 | Aqueous magenta dispersion liquid-1 | Aqueous black dispersion liquid-1 | Comparative aqueous cyan dispersion liquid-1 | Comparative aqueous cyan dispersion liquid-2 |
| Emulsion-polymerized toner | Cyan toner-1 | Yellow toner-1 | Magenta toner-1 | Black toner-1 | Cyan toner-2 | Cyan toner-3 |
| Pigment utilization performance | Good | Good | Good | Good | Fair | Poor |
| Volume average particle diameter (DV50 (μm)) | 5.3 | 5 | 5.5 | 5.5 | 7.3 | Particles are not formed |
| Evaluation of proportion of fine particles 13 μm or less) | Fair | Good | Good | Good | Fair | — |
| Evaluation of proportion of coarse particles (15 μm or more) | Good | Good | Good | Good | Good | — |

It is to be noted that emulsion-polymerized toners were produced using cyan colored aqueous pigment dispersion liquids obtained in Examples 5 to 9 respectively, and the same evaluation as that described above was performed. As a result, emulsion-polymerized toners having small proportions of fine particles and coarse particles were able to be produced with satisfactory pigment utilization performance.

<Production (2) of Aqueous Pigment Dispersion Liquid>

Examples 11 to 16

Aqueous pigment dispersion liquids (aqueous yellow dispersion liquids-2-7) were obtained in the same manner as in previously mentioned Examples 1 to 4, except that the combinations shown in Table 6 were adopted. As the pigment, Pigment Yellow 185 (PY-185) (trade name "Paliotol Yellow D-1155, manufactured by BASF SE) was used. pH, the viscosity (mPa·s), and the number average particle diameter (nm) of the pigment at 25° C. were measured for the obtained aqueous pigment dispersion liquids. In addition, pH, the viscosity (mPa·s), and the number average particle diameter (nm) of the pigment at 25° C. after storing the obtained aqueous pigment dispersion liquids at 50° C. for 1 week were measured. Results are shown in Table 6.

TABLE 6

| Example | 11 | 12 | 13 | 14 | 15 | 16 |
|---|---|---|---|---|---|---|
| Aqueous yellow dispersion liquid | -2 | -3 | -4 | -5 | 0 | -7 |
| PY-185 (parts) | 25 | 25 | 25 | 25 | 20 | 20 |
| Solution of random dispersant-2 (parts) | 12.5 | | | | | |
| Solution of random dispersant-3 (parts) | | 25 | | | | |
| Solution of block dispersant-2 (parts) | | | 31.3 | | | |
| Solution of block dispersant-3 (parts) | | | | 31.3 | | |
| Solution of random dispersant-5 (parts) | | | | | 10 | |
| Solution of graft dispersant-2 (parts) | | | | | | 10 |
| Glycerin (parts) | 5 | 5 | 5 | 5 | 5 | 5 |
| Water (parts) | 157.51 | 45 | 38.7 | 38.7 | 65 | 65 |
| Total (parts) | 100 | 100 | 100 | 100 | 100 | 100 |
| pH | 7.0 | 7.3 | 7.0 | 7.1 | 3.8 | 3.9 |
| Viscosity (mPa · s) | 13.0 | 13.3 | 9.8 | 10.6 | 23.0 | 15.4 |
| Number average particle diameter of pigment (nm) | 103 | 102 | 99 | 104 | 130 | 132 |
| pH after storage | 6.8 | 6.3 | 6.8 | 6.8 | 4.0 | 4.3 |
| Viscosity after storage (mPa · s) | 112.8 | 13.0 | 10.0 | 10.1 | 25.0 | 14.8 |
| Number average particle diameter of pigment after storage (nm) | 108 | 106 | 100 | 107 | 134 | 140 |

Comparative Examples 5 to 8

Aqueous pigment dispersion liquids (comparative aqueous yellow dispersion liquids-1-4) were obtained in the same manner as in previously mentioned Examples 1 to 4, except that the combinations shown in Table 7 were adopted. As the pigment, Pigment Yellow 185 (PY-185) (trade name "Paliotol Yellow D-1155, manufactured by BASF SE) was used. pH, the viscosity (mPa·s), and the number average particle diameter (nm) of the pigment at 25° C. were measured for the obtained aqueous pigment dispersion liquids. In addition, pH, the viscosity (mPa·s), and the number average particle diameter (nm) of the pigment at 25° C. after storing the obtained aqueous pigment dispersion liquids at 50° C. for 1 week were measured. Results are shown in Table 7.

emulsion-polymerized toners having small proportions of fine particles and coarse particles were able to be produced with satisfactory pigment utilization performance.

TABLE 7

| Comparative Example | 5 | 6 | 7 | 8 |
|---|---|---|---|---|
| Sample name | Comparative aqueous yellow dispersion liquid-1 | Comparative aqueous yellow dispersion liquid-2 | Comparative aqueous yellow dispersion liquid-3 | Comparative aqueous yellow dispersion liquid-4 |
| PY-185 (parts) | 25 | 25 | 20 | 20 |
| Polyoxyethylene styrylphenyl ether (HLB 15.6) (parts) | 5 | | | |
| Solution of block comparative dispersant (parts) | | 25 | | |
| Solution of draft comparative dispersant-1 (parts) | | | 25 | |
| Solution of graft comparative dispersant-2 (parts) | | | | 25 |
| Glycerin (parts) | 5 | 5 | 5 | 5 |
| Water (parts) | 65 | 45 | 50 | 50 |
| Total (parts) | 100 | 100 | 100 | 100 |
| pH | 6.8 | 8.1 | 3.9 | 8.5 |
| Viscosity (mPa · s) | 10.3 | 10.7 | 30.4 | Gel-like (dispersion impossible) |
| Number average particle diameter of pigment (nm) | 99 | 103 | 123 | — |
| pH after storage | 6.7 | 8.0 | 4.0 | — |
| Viscosity after storage (mPa · s) | 20.3 | 10.7 | 50.4 | — |
| Number average particle diameter of pigment after storage (nm) | 155 | 103 | 180 | — |

<Production (2) of Emulsion-Polymerized Toner>

Application Experiment Examples 5 to 9, and Application Experiment Examples—Comparison 3 and Comparison 4

Emulsion-polymerized toners were obtained in the same manner as in previously mentioned Application Experiment Example 1, except that aqueous yellow dispersion liquids shown in Table 8 were used respectively in place of aqueous cyan dispersion liquid-1.

<Evaluation (2) of Emulsion-Polymerized Toner>

The pigment utilization performance (rate of pigment utilized) and the proportions of fine particles and coarse particles were evaluated in the same manner as in previously mentioned "Evaluation (1) of Emulsion-polymerized Toner". Results are shown in Table 8.

INDUSTRIAL APPLICABILITY

When the aqueous pigment dispersion liquid of the present invention is used for producing an emulsion-polymerized toner, a pigment can efficiently be introduced in the toner, and therefore the pigment utilization performance can be improved. In addition, a toner having small contents of fine particles and coarse particles can be obtained, and therefore the utilization rate in toner production can be improved, an effect of reducing costs or the like can be obtained, and the aqueous dispersion liquid of the present invention can contribute to reduction in environmental load and energy. The pigment dispersion liquid of the present invention is useful as a material for producing, for example, a toner for a copying machine.

TABLE 8

| Application Experiment Example | 5 | 6 | 7 | 8 | 9 | Comparison 3 | Comparison 4 |
|---|---|---|---|---|---|---|---|
| Aqueous yellow dispersion liquid | -2 | -3 | -4 | -5 | -6 | Comparative aqueous yellow dispersion liquid-1 | Comparative aqueous yellow dispersion liquid-2 |
| Pigment utilization performance | Good | Good | Good | Good | Good | Fair | Poor |
| Volume average particle diameter (DV50 (μm)) | 5.9 | 5.4 | 5.3 | 6.5 | 6.6 | 7.9 | Particles not observed |
| Evaluation of proportion of fine particles (3 μm or less) | Good | Good | Good | Good | Good | Fair | — |
| Evaluation of proportion of coarse particles (15 μm or more) | Good | Good | Good | Good | Good | Good | — |

It is to be noted that the emulsion-polymerized toners were also produced according to a method of depositing toner particles by adding a salt not according to the above-described production method utilizing a clouding point, and the evaluations which are the same as those described above were performed. As a result, when the aqueous pigment dispersion liquids of the present embodiment were used,

The invention claimed is:

1. An aqueous pigment dispersion liquid comprising:
   a pigment;
   a dispersant that disperses the pigment; and
   an aqueous medium comprising water,
   wherein the dispersant is a polymer comprising: a constitutional unit (A) derived from a monomer (A'); and a constitutional unit (B) derived from a monomer (B') having a carboxy group or an amino group, wherein in the monomer (A'), a group comprising a (meth)acryloyloxy group or a (meth)acryloylamino group is bonded to one end of any one of the following molecular chains of (i) to (iii):
  (i) a polyethylene glycol chain having an average number of repeating oxyethylene units n in a range from 4 to 20;
  (ii) a polyethylene glycol monoalkyl (C1-18) ether chain having an average number of repeating oxyethylene units n in a range from 4 to 9; and
  (iii) a molecular chain represented by the following formula (1), the molecular chain having an average number of repeating oxyethylene oxypropylene units n in a range from 20 to 50 and a content of an oxyethylene unit in a range from 70 to 92% by mass:

$$R\text{—}(OEt)_x\text{-}(OPr)_y\text{-}A \qquad (1)$$

wherein R represents a C1-18 alkyl group, A represents OH or $NH_2$, Et represents an ethylene group, Pr represents a propylene group, and x+y=n,
  a content of the oxyethylene unit derived from the monomer (A') in the polymer is in a range from 50 to 90% by mass relative to a total mass of the polymer,
  the polymer is (a) an A-B block copolymer or (b) an A-B-A block copolymer, having a polymer block A comprising the constitutional unit (A) and a polymer block B comprising the constitutional unit (B),
  the polymer has a number average molecular weight in terms of polystyrene in a range from 4,000 to 15,000, as measured by gel permeation chromatography,
  the polymer is water-soluble,
  the polymer has a clouding point in a range from 50 to 80° C.,
  the carboxy group or the amino group present in the monomer (B') and introduced to the polymer is not neutralized and is not ionized in the polymer,
  the aqueous pigment dispersion liquid has a pH in a range from 3.0 to 8.4,
  the polymer adsorbs onto a surface of the pigment in the dispersion liquid, and
  the aqueous pigment dispersion is configured to provide an emulsion-polymerized toner.

2. The aqueous pigment dispersion liquid according to claim 1, wherein
  the monomer (B') is (meth)acrylic acid, or at least one monomer selected from the group consisting of vinylpyridine, vinylimidazole, and dimethylaminoethyl (meth)acrylate, and
  a content of the constitutional unit (B) in the polymer is in a range from 3 to 15% by mass based on the total mass of the polymer.

3. The aqueous pigment dispersion liquid according to claim 1, wherein
  the pigment is a yellow-based pigment comprising Pigment Yellow 185, and
  the monomer (B') is the monomer having an amino group.

4. The aqueous pigment dispersion liquid according to claim 1, wherein the pigment has a number average particle diameter in a range from 80 to 300 nm, as measured by a light scattering method.

5. The aqueous pigment dispersion liquid according to claim 1, wherein
  a content of the pigment is in a range from 10 to 40% by mass, and
  a content of the dispersant is in a range from 5 to 60% by mass based on the content of the pigment.

6. The aqueous pigment dispersion liquid according to claim 1, wherein
  the pigment is Pigment Yellow 185, and
  a content of the pigment is in a range from 20 to 40% by mass.

* * * * *